June 11, 1935.　　　J. F. HALDEMAN　　　2,004,866
SUBMERSIBLE PUMP AND ELECTRIC MOTOR UNIT
Filed Oct. 4, 1934
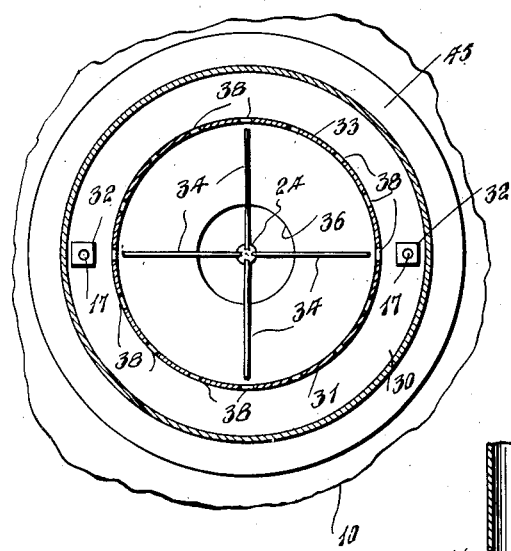
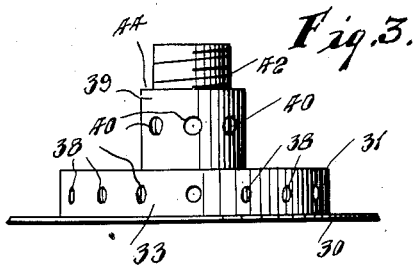
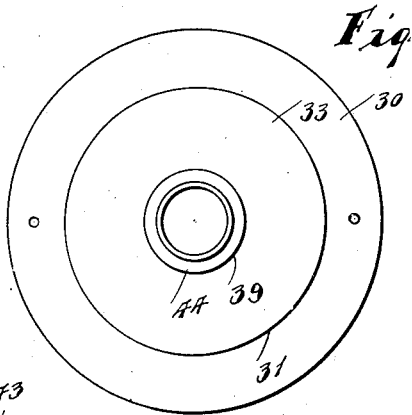
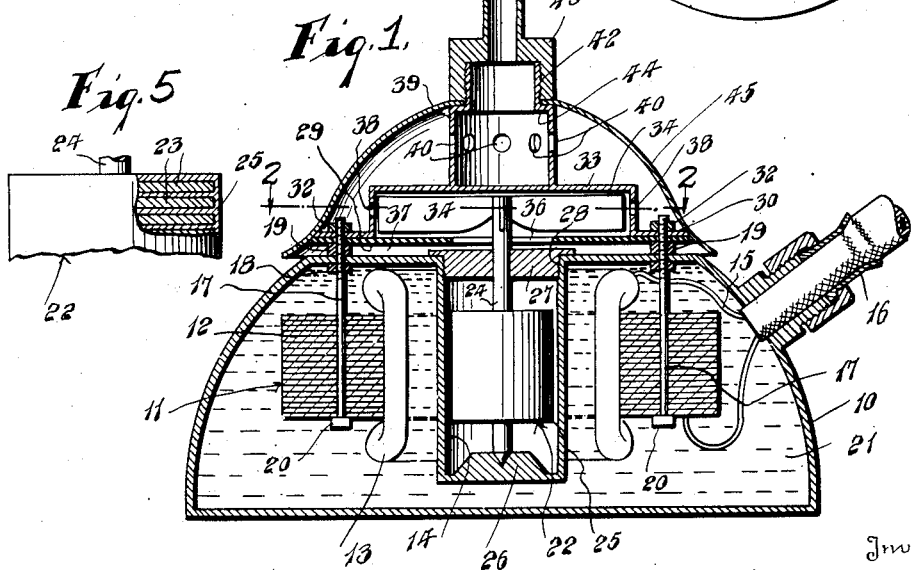
Inventor
J. F. Haldeman,
By L. F. Randolph Jr.
Attorney Patented June 11, 1935

2,004,866

UNITED STATES PATENT OFFICE 2,004,866

SUBMERSIBLE PUMP AND ELECTRIC MOTOR UNIT

James F. Haldeman, Bloomfield, Ind.

Application October 4, 1934, Serial No. 746,919

REISSUED

3 Claims. (Cl. 103—87)

This invention relates to a pump and electric motor unit designed to efficiently operate when submerged and for instance when used in an aquarium as a fountain, in a well for irrigating purposes, or otherwise.

It is particularly aimed to provide a novel construction which will resist erosive action of the water to a minimum, having the stator air and water tight and also having the laminations of the armature plated with copper or other metal, the stator preferably being within an enclosure containing an insulating compound which serves to conduct and dissipate the heat from the motor.

It is also aimed to provide a novel pumping construction and casing in association with the electric motor.

The more specific objects and advantages will become apparent from a consideration of the description following taken in connection with accompanying drawing illustrating an operative embodiment.

In said drawing:—

Figure 1 is a substantially central vertical sectional view through the unit or assembly, Figure 2 is a horizontal sectional view taken on the line 2—2 of Figure 1, Figure 3 is a detail elevation of the pump casing, Figure 4 is a plan view of said casing, and Figure 5 is a fragmentary elevation, partly broken away disclosing the construction of the motor armature.

Referring specifically to the drawing wherein like reference characters designate like or similar parts, an air and water tight, metallic base or casing is provided at 10 containing the stator 11 of the motor. This stator comprises a field core 12 and associated coils 13 which surround a central depending well 14 forming a part of the casing 10. The current supply wires for the stator are shown at 15 and lead into the casing 10 through any suitable water and air tight compression fitting as at 16. Said field core 12 is held in place by a suitable number of bolts 17 which pass therethrough, and which are secured to the upper wall of casing 10 by means of nuts 18 and 19, threaded on the bolts and engaging opposite sides of said wall. The heads 20 of the bolts are lowermost so that the core will rest thereon.

The casing 10, aside from the well 14, is filled with a suitable compound 21 so as to conduct the heat away from the core and dissipate it, such compound for instance being of a coal tar or asphaltic base.

The rotor of the motor 22 comprises an armature made up of laminations 23 carried by a vertical shaft 24, the latter being made of any suitable rust-resisting metal. Said laminations or plates 23, prior to assembly or connection to the shaft 24 are individually plated with copper, zinc or any other preferred metal to resist corrosion. After assembly of the plated plates or laminations 23 on the shaft 24, such plates as a unit are again plated with copper, zinc or other preferred metal. The plating is preferably effected by electrodeposition and is shown at 25. A suitable bearing 26 is provided in the base well 14 for the lower end of the shaft 24 and such shaft is journaled in a bearing 27, screw-threaded at 28 in the upper end of the well 14, in a water tight manner. The shaft 24 extends above the bearing 27 so as to drive the pump assembly.

An annular plate or disk 29 has the upper ends of the bolts 17 passing removably therethrough and said upper ends of the bolts 17 also removably pass through a base flange 30 of a pump casing 31, nuts 32 being screwed on the upper ends of the bolts and tightened against the flange 30. Said casing includes a chamber 33, in which are located piston vanes 34 attached to the aforesaid shaft 24 so as to form the pump. It will be noted that the plate 29 extends inwardly under the pump chamber 33, having an enlarged central opening at 36 so that water may pass into the pump chamber from the space 37, between the top wall of casing 10 and the plate 29, due to the spacing effected by nuts 19.

The side wall of the pump chamber is perforated as at 38 so that the water may leave the same and the casing has an upper hollow section 39, perforated at 40, so that discharging water may enter the same and flow through a discharge pipe 41.

Said discharge pipe 41 is screw-threaded as at 42 to the upper end of the casing part 39. Between the base 43 of said pipe, and a shoulder 44 on said portion 39, a bell 45 is removably fastened, which bell telescopes over but is not connected to the peripheral edge of the plate 29. A water tight joint, however, is maintained through the contact of said peripheral edge of plate 29 with the interior wall of bell 45. Such bell 45 extends below the plate 29, flaring outwardly at its lower edge, so as not to close the passageway 37.

It is to be noted that the electric motor parts shown are substantially the same as are used in electric motors of the conventional shaded pole alternating current induction motor, being modified, however, as previously described to accommodate use in the present construction, particularly as regards the mounting of the core 11, the plating of the rotor, the mounting of the rotor and the accommodation of the compound 21.

In the use of the device, the impeller or piston afforded by the blades 34, will draw fluid, when the unit or assembly is submerged, through passageway 37, opening 36, ports 28, between the casing of the pump and hood 45, through ports 40 and thence through the discharge pipe 41.

Various changes may be resorted to provided they fall within the spirit and scope of the invention.

I claim as my invention:

1. A device of the class described comprising a casing having a chamber, an impeller in said chamber, a discharge pipe leading from the casing, said discharge pipe having an inlet, said chamber having outlet openings, a hood secured over said casing by said discharge pipe to confine the discharge from the chamber and cause it to pass into the inlet of the discharge pipe, a plate adjacent the bottom of the hood surrounded by the hood and having an opening constituting an inlet for the chamber, a base having an electric motor therein, the armature shaft of the motor extending above the base and through said opening and driving the impeller, bolts connecting the field core of the motor, said casing and plate together, and means spacing the plate and casing from the base and surrounding said bolts.

2. A device of the class described comprising a casing having a chamber, an impeller in said chamber, a discharge pipe leading from the casing, said discharge pipe having an inlet, said chamber having outlet openings, a hood secured over said casing by said discharge pipe to confine the discharge from the chamber and cause it to pass into the inlet of the discharge pipe, a plate adjacent the bottom of the hood surrounded by the hood and having an opening constituting an inlet for the chamber, a base having an electric motor therein, the armature shaft of the motor extending above the base and through said opening and driving the impeller, bolts connecting the field core of the motor, said casing and plate together, and means spacing the plate and casing from the base and surrounding said bolts, said base having a central well in which the rotor is disposed, and a removable bearing for the rotor shaft screw-threaded in the upper end of the well.

3. A device of the class described comprising a casing having a chamber, an impeller in said chamber, a discharge pipe leading from the casing, said discharge pipe having an inlet, said chamber having outlet openings, a hood secured over said casing by said discharge pipe to confine the discharge from the chamber and cause it to pass into the inlet of the discharge pipe, a plate adjacent the bottom of the hood surrounded by the hood and having an opening constituting an inlet for the chamber, a base having an electric motor therein, means spacing said plate and base, the armature shaft of the motor extending above the base and through said opening and driving the impeller, and means connecting the field core of the motor, said casing and plate together.

JAMES F. HALDEMAN.